(12) United States Patent
Dimitroff (10) Patent No.: US 11,760,034 B2
(45) Date of Patent: Sep. 19, 2023

(54) LOCKING FLUSH JOINT PIPE CONNECTION AND METHOD

(71) Applicant: Ted R. Dimitroff, Columbia, MO (US)

(72) Inventor: Ted R. Dimitroff, Columbia, MO (US)

(*) Notice: Subject to any disclaimer, the term of this patent is extended or adjusted under 35 U.S.C. 154(b) by 0 days.

(21) Appl. No.: 17/576,173

(22) Filed: Jan. 14, 2022

(65) Prior Publication Data

US 2023/0226774 A1 Jul. 20, 2023

(51) Int. Cl.
| | |
|---|---|
| *B29C 65/48* | (2006.01) |
| *B29C 65/56* | (2006.01) |
| *B29C 65/00* | (2006.01) |
| *E21B 17/046* | (2006.01) |
| *F16L 37/14* | (2006.01) |
| *F16L 21/02* | (2006.01) |
| *E21B 19/16* | (2006.01) |

(52) U.S. Cl.
CPC ......... *B29C 66/5221* (2013.01); *B29C 65/48* (2013.01); *B29C 65/564* (2013.01); *B29C 66/0224* (2013.01); *E21B 17/0465* (2020.05); *E21B 19/16* (2013.01); *F16L 21/02* (2013.01); *F16L 37/14* (2013.01)

(58) Field of Classification Search
None
See application file for complete search history.

(56) References Cited

U.S. PATENT DOCUMENTS

| | | |
|---|---|---|
| 4,182,519 A | 1/1980 | Wilson |
| 4,856,561 A | 8/1989 | Zicaro |
| 5,083,820 A | 1/1992 | Hopperdietzel |
| 5,580,068 A | 12/1996 | Gundy |
| 5,826,887 A | 10/1998 | Neumann et al. |
| 6,176,523 B1 | 1/2001 | Winslett |
| 7,097,211 B2 | 8/2006 | Adams |
| 7,811,034 B1 * | 10/2010 | Karow ................ B23D 21/006 82/131 |

(Continued)

FOREIGN PATENT DOCUMENTS

| | | |
|---|---|---|
| CN | 201090144 Y | 7/2008 |
| CN | 201739662 U | 2/2011 |

(Continued)

OTHER PUBLICATIONS

Machine translation of DE 3019623 (Year: 1981).*

(Continued)

*Primary Examiner* — Christopher T Schatz
(74) *Attorney, Agent, or Firm* — McKee, Voorhees & Sease, PLC (57) ABSTRACT

A method of borehole pipe installation begins with unfinished stick pipes brought to the installation site and then machined or cut to form male and female ends. The pipe ends are then locked together to form a flush joint. The lock can be provided via a groove cut into one of the ends for receipt of a lock gasket, which secures and seals the joint when the pipes are pushed together, and prevents the pipes from being pulled apart. Alternatively, to the groove and lock gasket, the ends can be glued and screwed together, with the screws allowing the joined pipes to be pulled through the borehole before the glue is dry. The pipe joint has flush exterior and interior surfaces to minimize borehole clearance and maximize fluid flow through the pipe assembly.

13 Claims, 7 Drawing Sheets

(56) References Cited

U.S. PATENT DOCUMENTS

| | | | |
|---|---|---|---|
| 2003/0075919 A1* | 4/2003 | Schulte-Ladbeck | ........................ B29C 65/562 285/368 |
| 2006/0076775 A1 | 4/2006 | Caldwell et al. | |
| 2013/0026752 A1* | 1/2013 | McPherson | ........... B29C 66/342 156/293 |
| 2016/0314722 A1* | 10/2016 | Cole | ........................ G09F 3/04 |
| 2020/0002912 A1* | 1/2020 | Rohlmeier | .............. F16L 1/028 |

FOREIGN PATENT DOCUMENTS

| | | |
|---|---|---|
| CN | 106439262 A | 2/2017 |
| CN | 214037318 U | 8/2021 |
| DE | 3019623 A1 | 11/1981 |
| EP | 0275055 B1 | 11/1992 |
| GB | 1494669 A | 12/1977 |
| GB | 2218166 A | 11/1989 |

OTHER PUBLICATIONS

Epipe, "Concrete Pipe Joints Your Best Choice", American Concrete Pipe Association, e-07-124, pp. 1-6, 2009.

Northwest Pipe Company, "Joint Detail: The Rolled Groove O-Ring Gasket Joint", https://www.nwpipe.com/about/news/joint-detail-the-rolled-groove-o-ring-gasket-joint/, pp. 1-8, Dec. 3, 2021.

Rieberlok, "Field Cut Pipe and Bevel", https://www.rieberlok.com/application/field-cut-instructions/, 1 page, Jan. 2022.

* cited by examiner

LOCKING FLUSH JOINT PIPE CONNECTION AND METHOD

FIELD OF THE INVENTION

The invention is directed to a locking flush joint pipe, and an on-site method of making the flush joint pipes, for use in trenchless installations.

BACKGROUND OF THE INVENTION

Underground pipe replacement projects, such as for sewer and water lines, are often done in business and residential areas with streets, driveways, and other obstacles which necessitate the use of trenchless boring, rather than open trench work. Current trenchless pipe replacement methods preferably utilize a borehole, with a pit at one or both ends, through which the pipe is pushed or pulled to create a close tolerance annular space around the pipe reduces air voids, soil settlement and pipe movement after installation is complete. Conventional bell joint connections, which are free from pipe grooves and have a smoothly curved profile, provide a smooth internal surface, but the external diameter is enlarged at the bell joint. Internal flush joints are the most common, since there is no restriction to fluid flow through the joined pipes. Bell joints are secured in various ways, such as a welded external sleeve, an external clamp, and external thrust blocks, or internal threads on the ends of the pipes. A sealant or joint compound is often used to eliminate leakage at the joint. Gaskets may also be used to eliminate leakage, such as in a bell socket, which enlarges the outside diameter adjacent the joint. One commercially available example of the lock gasket is the RieberLok sold by Ransom International, LLC, of Birmingham, Ala. These commercial locking gaskets are designed for use in bell joints pipes, without grooves in the pipe wall.

The larger diameter of a bell socket requires a larger diameter bore hole, which creates a larger annular space around the pipe. Also, current designs for pipe joints require long areas to assemble the pipes together, with repeated handling of the pipes, which adds to the labor costs and cost of excavations. Current pipe designs are machined offsite, at the manufacturing facility, to include the bell socket or threads or other coupling means. This offsite manufacturing, at locations remote from the installation site, eliminates or minimizes the ability to customize the pipe lengths as needed in the field. If a pipe having a bell socket is cut to a shorter length in the field, the cut off end without the bell socket cannot be connected to another piece of pipe, and thus is wasted, because new bell sockets cannot be readily made at the job site.

Manufactured pipe sticks typically are 10-20 feet in length, and require an additional 4 feet of pit length for assembly. Longer pits are problematic in many areas, such as within city limits, where streets, existing utilities, and easements often limit the pit length. Also, pit excavation is costly, and the longer the pit, the more cost for the pipe project.

A further problem with current pipe technology is that the manufacturer has to make and stock pipes for different applications, depending on the fluid or liquid material to be carried or passed through the pipe, and/or corresponding to internal pipe pressures. The manufacturing often produces the pipes in various colors, coded to match the fluid or liquid or pressure ratings. Thus, the manufacturer stocks, for example, 5-6 different colored pipe, which adds to manufacturing costs. Current locking joint pipe has a cost of approximately $45/foot from the manufacturer. Thus, pipe costs become a significant factor for municipalities or others responsible for pipe repair or replacement, such as in water or sewer lines.

No flush joint pipe is commercially available for high pressure water mains. Conventional installations use a bell joint pipe with a sealing gasket, and metal joint restrainers to withstand pressures of 200-300 PSI. Locking gaskets are also known for high pressure pipes, but also require a bell socket for installation, which increases the external pipe diameter. No locking joint gaskets are designed for flush joint pipes.

Non-pressurized lines, such as gravity sewer lines, do not require the joint restrainers, and typically have a sealing gasket in a bell socket where the pipe ends are joined. Such sealing gaskets will not hold the pipe ends together in a pressurized line. These pipes must be installed in an open excavation, rather than a borehole, since the pipe segments cannot be pulled through the borehole without joint restrainers.

Therefore, there is a need for a more cost effective method for use in pipe new and replacement projects, which allows for on-site customization and assembly which minimizes material and labor costs, while providing a secure pipe connection and problem-free trenchless installation.

Accordingly, a primary objective of the present invention is the provision of a method of assembling pipes on-site with interior and exterior flush joints.

A further objective of the present invention is the provision of a pipe assembly having a flush joint having constant or consistent internal and external surface diameters.

A further objective of the present invention is the provision of a method of machining and assembling stick pipes at a borehole installation site.

Still another object of the present invention is the provision of stick pipes which are coupled and locked end-to-end at a trenchless installation site.

Another objective of the present invention is a provision of a pipe assembly which is free from sleeves, threads, bolts, clamps, thrust blocks, and bell sockets.

A further objective of the present invention is the provision of a pipe assembly method which allows for customized pipe lengths to be created at the installation job site.

Yet another objective of the present invention is the provision of a creating a locked butt joint for pipes, in-situ, with smooth interior and exterior pipe surfaces.

Another objective of the present invention is the provision of a borehole pipe installation which minimizes air voids around the pipe and soil settlement after installation.

Still another objective of the present invention is a method of adding indicia to the pipe at a borehole installation site to identify the pipe usage.

Yet another objective of the present invention is the provision of a trenchless pipe installation method which minimizes the length of the pit.

A further objective of the present invention is the provision of a trenchless pipe installation which is economical, secure, and simple.

These and other objectives become apparent from the following description of the invention.

SUMMARY OF THE INVENTION

A method for making a pipe joint with flush internal and external surfaces uses pipe sticks having unfinished ends which are then cut to a desired length at the borehole installation site to form male and female ends. The method then locks the male and female ends together. In one method, a groove is machined into one of the male or female ends, into which a close fit locking gasket is placed. Then, the male and female ends are pushed together, with the locking gasket preventing the ends from being pulled apart. In an alternative method, adhesive is applied to one or both ends before the ends are coupled, and secured the pipe ends when the adhesive is dry. Screws may be screwed into the male and female ends to hold the pipes together for pulling through the borehole before the adhesive cures. The resulting pipe assembly has the male and female ends butt joined together to form a pipe assembly having constant internal and external diameters, which minimizes installation problems through a borehole, and maximizes fluid flow through the pipe segment.

The method also includes application of a mark or indicia on the pipe at the job site, either before or after the pipe is cut. The mark indicates the intended use of the pipe, such as the type of material to be carried by the pipe, and/or the pressure capability of the pipe, such as for pressurized water lines.

DETAILED DESCRIPTION OF THE INVENTION

Figure 1:
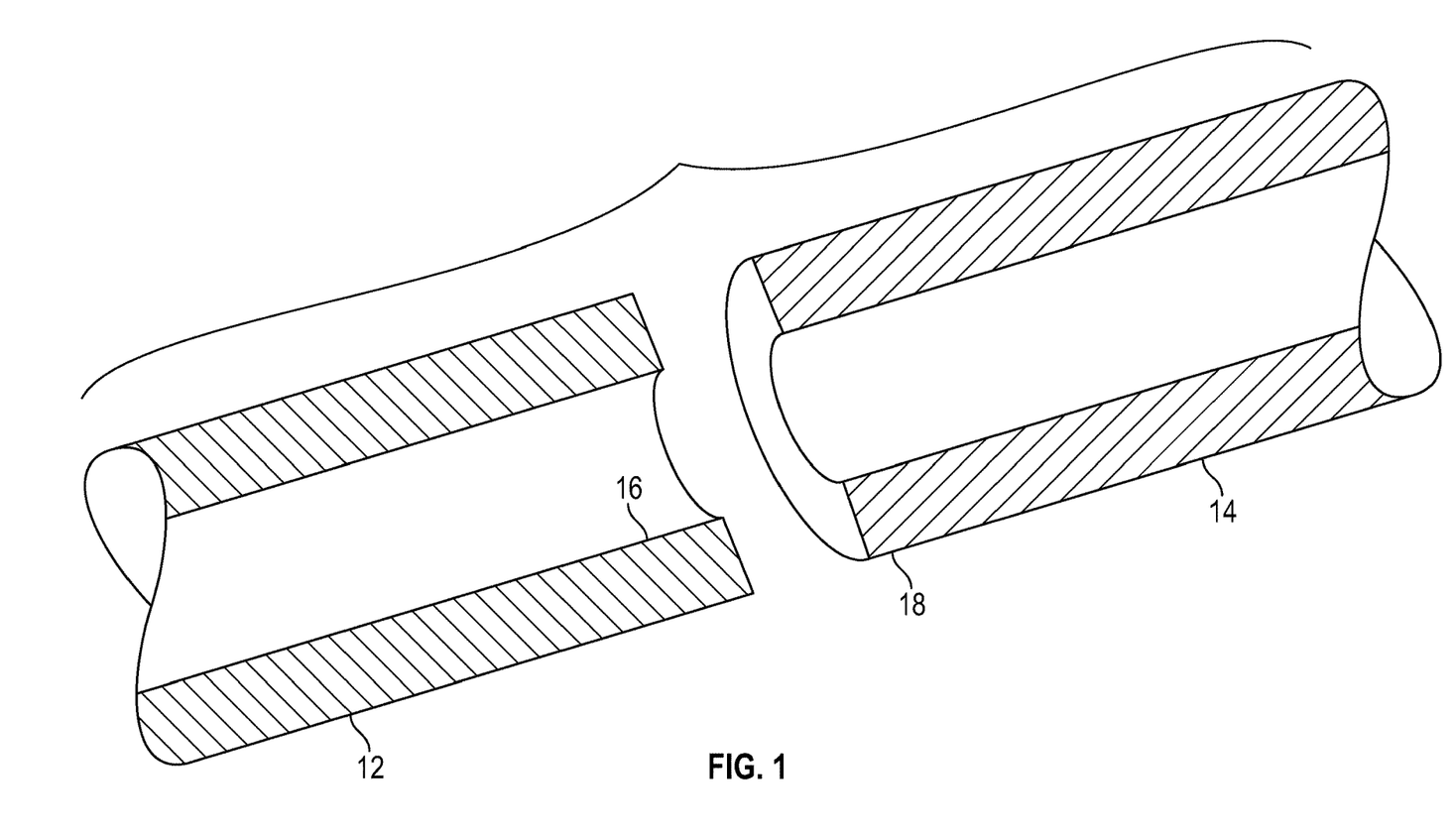
FIG. 1 is a sectional exploded perspective view of first and second stick pipes, with unfinished ends, for use in the method according to the present invention.
Figure 2:
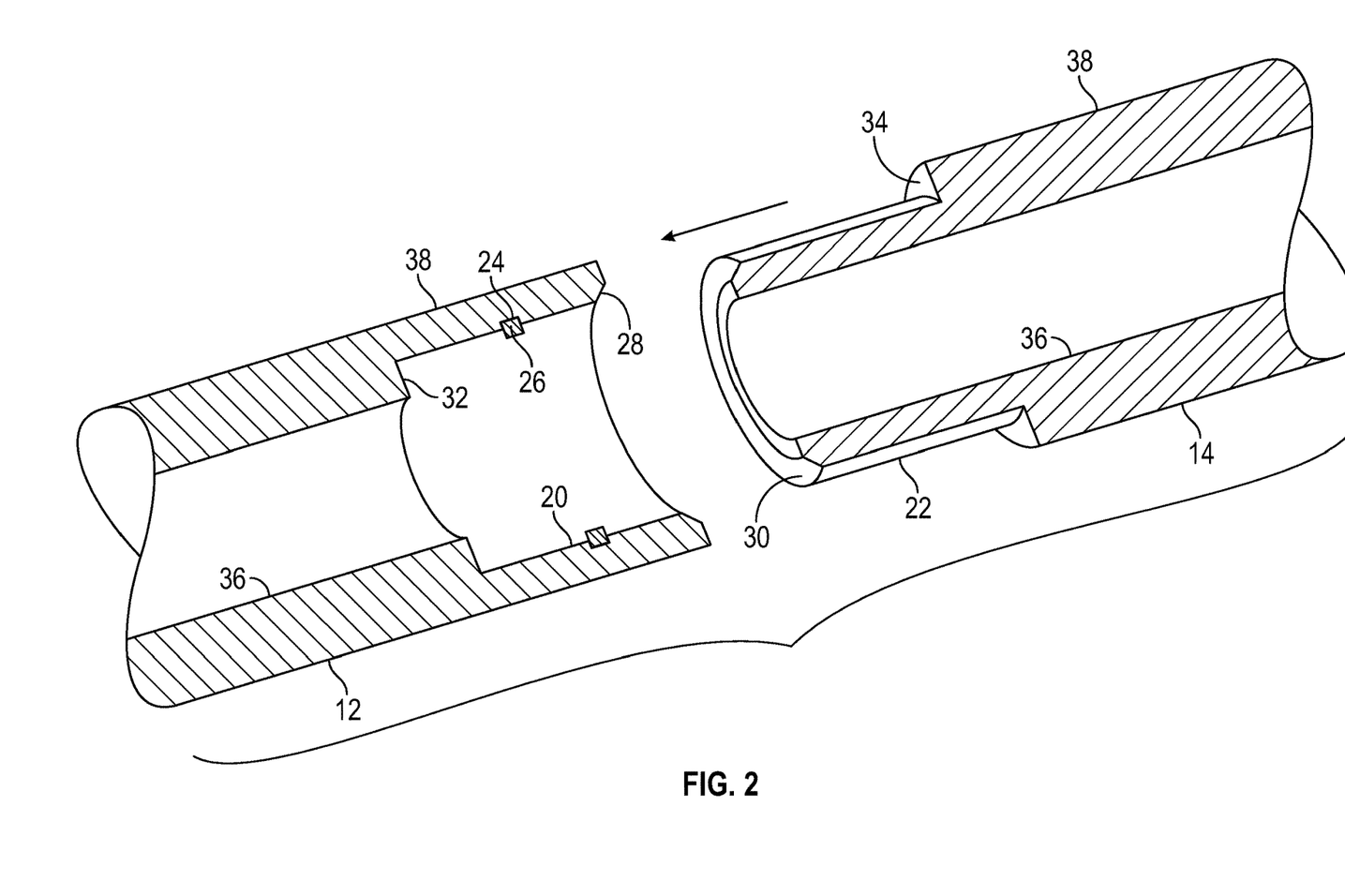
FIG. 2 is a sectional exploded perspective view of first and second stick pipes after the ends are machined, disassembled, ready for coupling, according to a first embodiment of the present invention.
Figure 3:
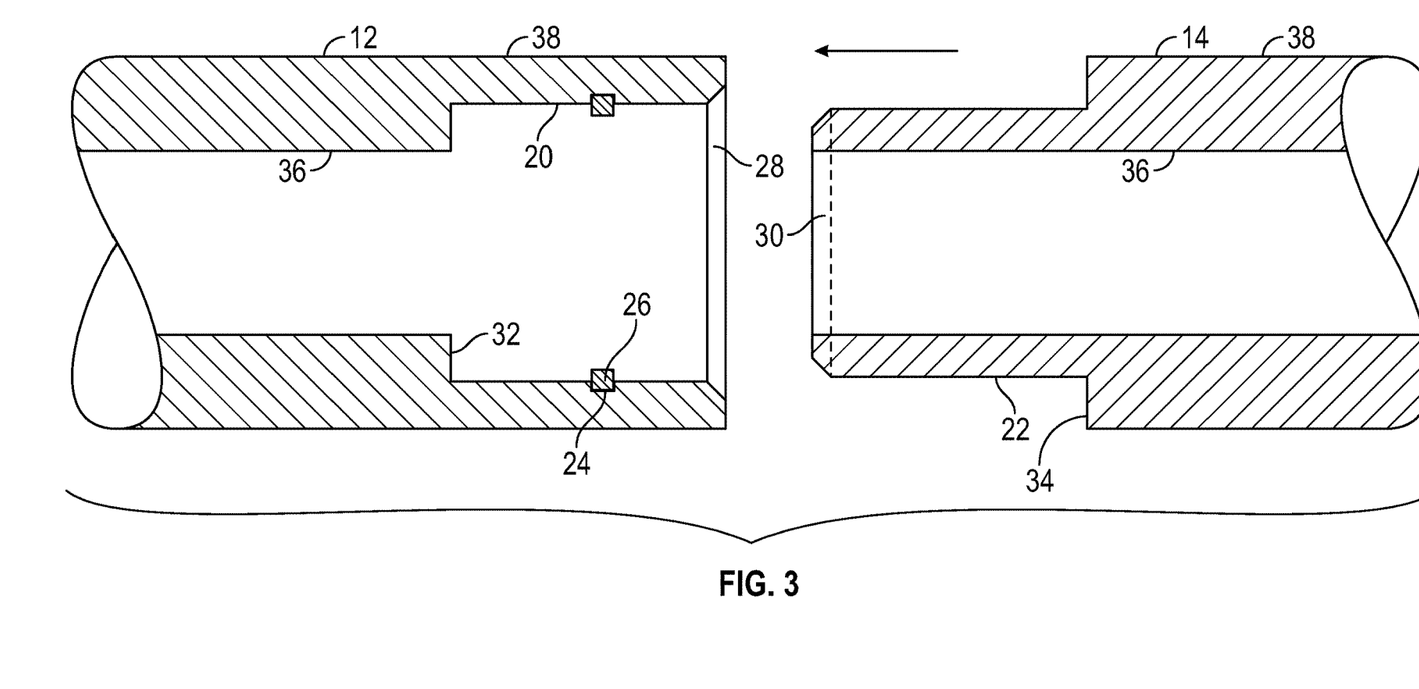
FIG. 3 is a sectional view of the disassembled pipes shown in FIG. 2.
Figure 4:
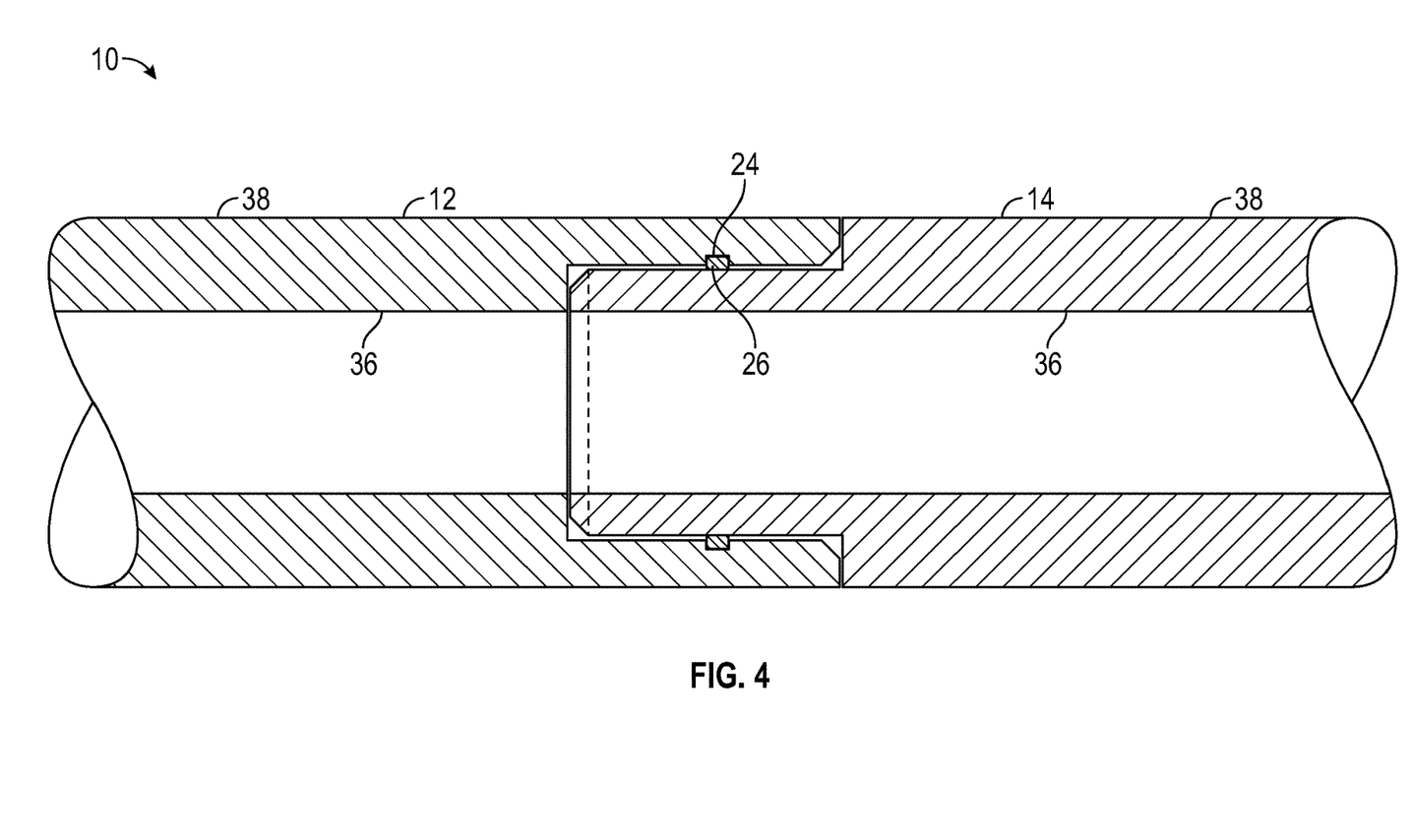
FIG. 4 is a sectional view showing the first and second pipes joined together, according to the present invention.

The finished pipe assembly 10 begins with a first stick pipe 12 and a second stick pipe 14 which are brought to a trenchless or borehole pipe installation site. The pipe segments 12, 14 are preferably plastic, such as PVC. The first and second stick pipes 12, 14 have unfinished ends 16, 18, respectively when the stick pipes are delivered to the installation job site. At the job site, the first stick pipe 12 is machined, for example using a field cutting portable router machine, to form a female end 20, and the second stick pipe 14 is machined to form a male end 22. Then, an annular groove 24 is formed into one of the female or male ends 20, 22. Preferably, the groove has a minimal depth, so as to maximize or maintain a sufficient thickness of the pipe wall. Also, the groove is formed with square inside corners. While the drawings show the groove 24 formed on the internal surface of the female end 20, it is understood that, alternatively, the groove 24 can be formed on the external surface of the male end 22. After the groove 24 is cut, a close tolerance fit locking gasket 26 is inserted into the groove, and then the pipes 23, 14 are pushed together to lock and create the flush joint. "Close tolerance fit" means that the gasket 26 fits tightly in the groove 24, which helps retain the gasket in the groove as the pipes are pushed together. To achieve the desired tight fit, the gasket 26 has a profile, or cross section, which substantially matches the profile cross section of the groove 24, so that the gasket engages the opposite sides of the groove, and extends a minimal distance out of the groove, as shown in FIGS. 2-4.

Figure 5:
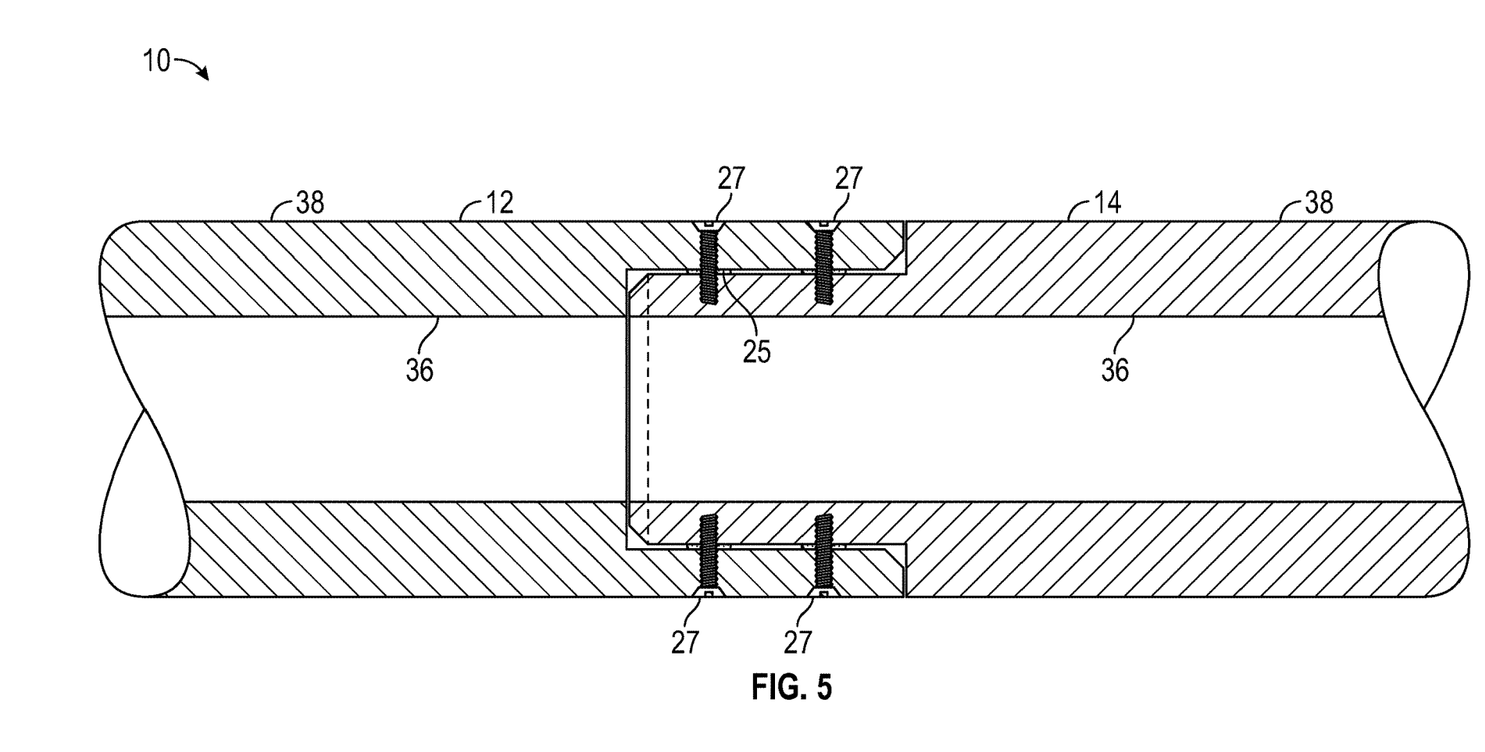
FIG. 5 is a sectional view, similar to FIG. 4, of an alternative embodiment of the invention, wherein the pipes are lockingly joined using adhesive and screws, rather than the groove and locking gasket.
Figure 7:
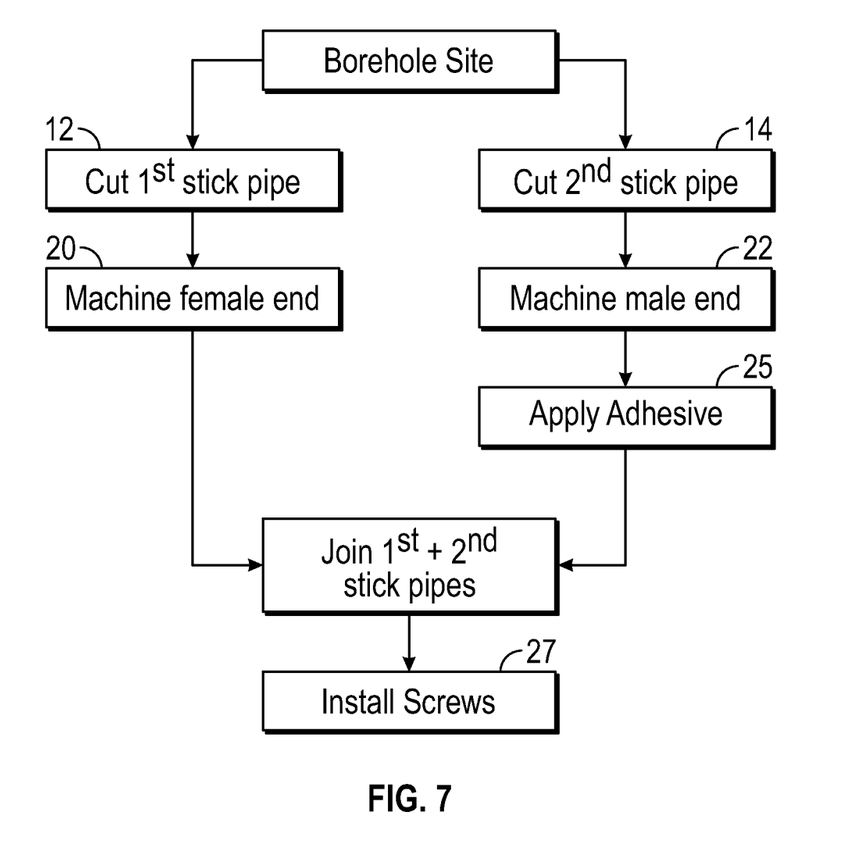
FIG. 7 is a schematic flowchart for the second embodiment method of the present invention, wherein the first and second pipe segments are machined and then joined using adhesive and screws at the borehole installation site.

FIGS. 5 and 7 show an alternative to the locking gasket 26, wherein adhesive or glue 25 is applied to either or both ends 20,22 prior to joining first and second pipe segments 12, 14 together. The adhesive 25 dries or cures after the segments are joined to seal and lock the segments together. Screws 27 may be used to hold the segments together after gluing, so that the joined segments can be pulled through the borehole without waiting for the adhesive to dry. The adhesive lock joint eliminates the need for the groove 24 and the lock gasket 26.

A beveled or chamfered edge 28 is formed on the female end 20, and a beveled or chamfered edge 30 is formed on the male end 22. The beveled edges 28, 30 can be formed before or after the groove 24 is cut to facilitate alignment of the pipes 12, 14 for joining After the first and second stick pipes 12, 14 are machined on site to create the female and male ends 20, 22, the groove 24, and the beveled edges 28, 30, the pipes can be joined by pushing the female and male ends 20, 22 together until the ends abut the corresponding shoulders 32, 34 on the respective ends 20, 22 to form a butt joint. As seen in FIG. 4, the pipe assembly 10 created by the connected pipes 12, 14 has a flush interior surface 36, and a flush exterior surface 38. Thus, the interior surface 36 of the pipe assembly 10 has a constant, unchanged inside diameter on both sides of the pipe joint, as well as a constant, unchanged exterior diameter on both sides of the pipe joint. The lock gasket 36 only allows movement of the pipes 12, 14 in one direction, and prevents the first and second pipes from being pulled apart, thus eliminating the need for an exterior sleeve, internal threads, bolts, clamps, thrust blocks, bell sockets, or other connection components which would change the internal or external diameters of the flush butt joint of the pipe assembly 10. The lock gasket 26 also eliminates the need for any sealant, such as joint compound, being used on the coupling of the pipes 12, 14.

Figure 6:
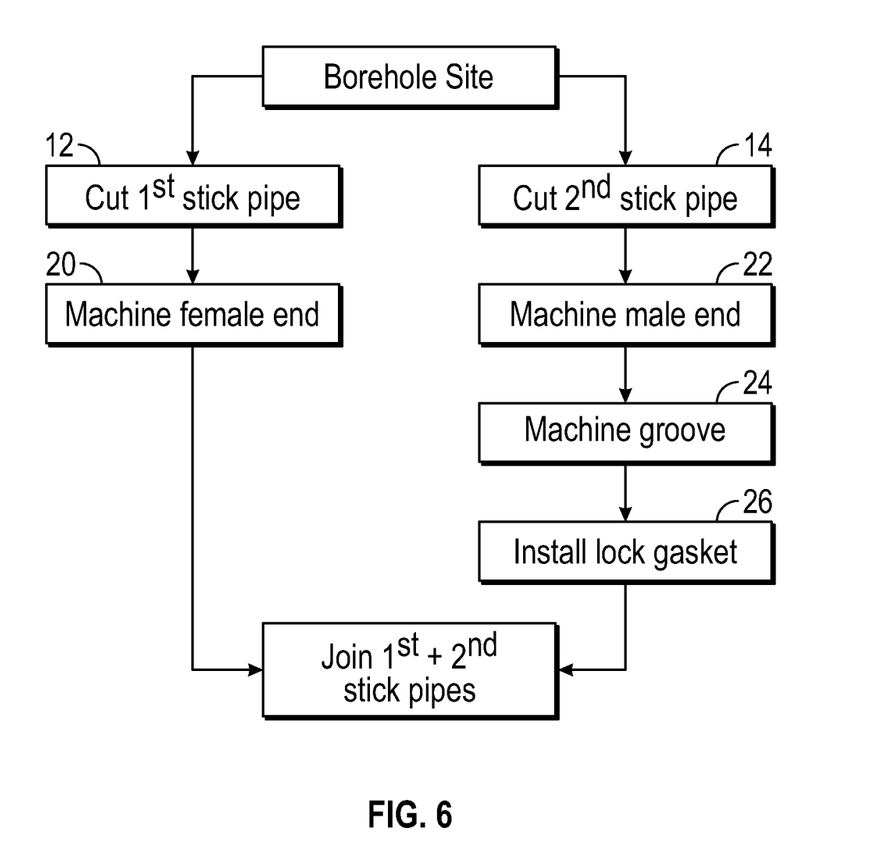
FIG. 6 is a schematic flowchart for the first embodiment method of the present invention, wherein first and second stick pipes are machined and then joined at the borehole pipe installation site.

FIG. 6 schematically illustrates the method of the first embodiment of the present invention, which takes place totally at the jobsite wherein the pipe assembly 10 is to be installed into a borehole. The stick pipes 12,14 are brought to the borehole site, wherein the female and male ends 20, 22 are cut or machined. Then, the groove 24 is cut or machined to either the male or female end and the lock gasket 26 is installed. Then, the pipes are pushed together to create a flush butt joint with smooth internal and external surfaces. Though not shown in FIG. 5, it is understood that the beveled edges 28, 30 can be formed in the female and male ends 20, 22 any time after the ends are machined. Also, it is understood that the stick pipes 12, 14 can be cut at the job site to any desired length.

FIG. 7 schematically illustrates the method of the second embodiment of the present invention, which also is fully performed at the pipe installation site. The second method is the same as the first method, except that the gasket 26 is replaced by the adhesive 25, and optionally the screws 27. Both methods shown in FIGS. 6 and 7 provide an internal and external flush joint pipe that can be used in high pressure applications, such as municipal water lines, without blowing or pulling apart. Both methods also minimize the length of the installation pit, since the pipes can be cut to shorter lengths, thereby reducing construction costs.

These methods of cutting, machining, and joining pipes in the field to fit job site limitations and minimize pit sizes also eliminates wasted pipe, as any section that is cut can later be machined and joined to other pipe sections, since bell socket connections are not employed.

Preferably the pipe sticks or segments 12, 14 are marked at the job site to designate the usage of the pipe. For example, the pipes 12, 14 can be color coded to indicate specific materials to flow through the pipe assembly 10, and/or for the pressure rating of the pipe. For example, a first color can be used for potable water and a second color can be used for sewer water or other liquids. The color marking can be added to the pipes 12, 14 before or after cutting, using any suitable material, such as a die stamped, brushed or otherwise applied to the pipe. The marking can be in any form and can be continuous or discontinuous along the pipe, such as a stripe, a spiral line, a series of separate marks, or any other easily identifiable designation. Preferably, the marking or markings extend along the length of the pipe, and at least along a top portion, so that an installer can see the indicia from above the borehole pit, without moving or rotating the pipe. Apply the mark or indicia at the work site allows the manufacturer to produce and stock a single color pipe (preferably white), thereby minimizing manufacturing costs.

It is understood that the drawings are not drawn to scale, and the thickness of the walls of the pipes 12, 14 may be different than that shown in the drawings.

The pipe assembly 10 provides an internally and externally flush joint which maximizes fluid flow through the pipe assembly without turbulence and minimizes the clearance required to push or pull the pipe assembly through the borehole. Also, by bringing unfinished stick pipes to the jobsite and then finishing the pipe ends for joining at the jobsite, greatly reduces the cost of labor, materials and excavating pipe pits are all reduced. Also, customizing of the pipe assembly length on site further simplifies the installation process, and reduces time and costs.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A method of making a flush pipe joint in the field for connecting first and second stick pipes together in a pit for pulling into a borehole, comprising:

bringing the first and second stick pipes with unfinished ends to a borehole installation site; then cutting an exterior portion on one end of the first pipe stick to create a male end;

cutting an interior portion on one end of the second pipe stick to create a female end; then pushing the male and female ends together in the pit to create a flush pipe joint having smooth interior and exterior pipe surfaces;

locking the male and female ends together using adhesive so that the pipes can be pulled into the borehole, and defining a longitudinal axis for the pipes; and extending screws into the pipes in a direction substantially perpendicular to the longitudinal axis so as to secure the pipes for pulling into the borehole while the adhesive cures.

2. The method of claim 1 wherein the pipe joint is free of changes in diameter on the both the interior and exterior pipe surfaces.

3. The method of claim 1 wherein the male and female ends butt together.

4. The method of claim 1 further comprising marking the pipe sticks with indicia after being brought to the borehole site to designate usage of the pipe sticks.

5. The method of claim 1 wherein the male and female ends are pushed together without use of a bell socket.

6. The method of claim 1 wherein the male and female ends are joined together without threads, sleeves, clamps, bolts, thrust blocks and splines.

7. The method of claim 1 further comprising forming chamfers on the male and female pipe ends.

8. The method of claim 1 further comprising color coding at the borehole installation site the first and second pipe sticks to identify material to be carried in the pipe sticks.

9. The method of claim 1 wherein the pipes are cut at the borehole installation site to fit a project design.

10. A method of joining pipes at a field site having a borehole, comprising;

forming at the field site male and female ends on unfinished ends of a pair of pipes; then matingly engaging the male and female ends to connect the pipes, and defining a longitudinal axis for the pipes; then locking the pipe ends together with screws extending into the pipes substantially perpendicular to the longitudinal axis; and then installing the connected pipes into the borehole.

11. The method of claim 10 wherein the connected pipes have a flush joint.

12. The method of claim 10 further comprising placing an indicia on the pipes at the field site to identify material to be carried through the pipes.

13. The method of claim 10 wherein the joined pipes have a constant inside diameter and a constant outside diameter.

\* \* \* \* \*